(12) United States Patent
Jadhav et al.

(10) Patent No.: US 10,018,532 B2
(45) Date of Patent: Jul. 10, 2018

(54) METHOD AND APPARATUS FOR FURNISHING A FILTERED AIR SYSTEM STATE VARIABLE IN A CONTROL UNIT OF AN INTERNAL COMBUSTION ENGINE

(71) Applicant: Robert Bosch Gmbh, Stuttgart (DE)

(72) Inventors: Pandurang Jadhav, Bangalore (IN); Thomas Farr, Ludwigsburg (DE); Daniel Kuhn, Walddorfhaeslach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 295 days.

(21) Appl. No.: 14/962,564

(22) Filed: Dec. 8, 2015

(65) Prior Publication Data

US 2016/0161322 A1     Jun. 9, 2016

(30) Foreign Application Priority Data

Dec. 8, 2014   (DE) .................... 10 2014 225 176

(51) Int. Cl.
| | | |
|---|---|---|
| *G01F 25/00* | (2006.01) | |
| *G01M 15/09* | (2006.01) | |
| *G01L 19/02* | (2006.01) | |
| *G01L 27/00* | (2006.01) | |
| *G01M 15/04* | (2006.01) | |
| *G01F 15/00* | (2006.01) | |

(52) U.S. Cl.
CPC ............. *G01M 15/09* (2013.01); *G01L 19/02* (2013.01); *G01F 15/00* (2013.01); *G01F 25/0053* (2013.01); *G01L 27/002* (2013.01); *G01M 15/042* (2013.01)

(58) Field of Classification Search
USPC .......................................................... 702/45
See application file for complete search history.

(56) References Cited

U.S. PATENT DOCUMENTS

| | | | | |
|---|---|---|---|---|
| 5,031,450 A | * | 7/1991 | Nakaniwa | F02D 41/045 73/114.37 |
| 5,493,902 A | * | 2/1996 | Glidewell | F02D 41/22 123/479 |
| 2013/0325296 A1 | * | 12/2013 | Koshi | F02D 41/0085 701/104 |

* cited by examiner

*Primary Examiner* — Paul D Lee
(74) *Attorney, Agent, or Firm* — Norton Rose Fulbright US LLP; Gerard Messina

(57) ABSTRACT

A method is provided for identifying an averaged sensor value of a state variable of an air system for an internal combustion engine in a motor vehicle, comprising the following steps:
acquiring and temporarily storing sensor values at a predefined sampling interval during a segment duration of the state variable, the segment duration corresponding to one period of a pulsation of the state variable;
determining an average of the sensor values acquired within the segment duration;
correcting the average of the sensor values that has been determined, using a correction variable that depends on the time difference between the segment duration and a multiple of the sampling interval.

9 Claims, 3 Drawing Sheets

METHOD AND APPARATUS FOR FURNISHING A FILTERED AIR SYSTEM STATE VARIABLE IN A CONTROL UNIT OF AN INTERNAL COMBUSTION ENGINE

FIELD OF THE INVENTION

The present invention relates to the operation of internal combustion engines based on a state variable of the air system acquired in an engine system having an internal combustion engine, and in particular to actions to filter or smooth the state variable for further processing in an engine control unit.

BACKGROUND INFORMATION

Acquisition of one or more state variables relating to an air flow in an air system, for example a mass flow or a pressure, is necessary for the operation of an internal combustion engine. This variable is furnished to an engine control unit as a corresponding sensor signal.

Because of the regular opening and closing of the intake valves, however, pulsations occur in the flow of delivered fresh air in the air system of the internal combustion engine. Because of the offset interaction of the intake valves, the pulsations produced by the individual cylinders become superimposed, and form in the air system a pressure wave whose amplitude depends on the position of the throttle valve, the position of any exhaust gas recirculation valve, the geometry of conduits of the air system, and the engine speed.

The pulsation represents an interference variable in the state variable that is to be acquired, which is measured by sensors, for example the air mass sensor or pressure sensors, and is used in the engine control unit to control the internal combustion engine with the aid of actuators, for example the throttle valve of the exhaust gas recirculation valve, the wastegate valve, and the like.

Upon further processing of the state variable, as a rule the pulsation produced by engine operation is intended to remain out of consideration. State variables describing the air flow in the air system are therefore pre-processed by way of a digital filter concept in the engine control unit.

SUMMARY

A method for identifying an averaged sensor value of a state variable of an air system for an internal combustion engine, and the apparatus in accordance with the coordinated claim, are provided according to the present invention.

According to a first aspect, a method for identifying an averaged sensor value of a state variable of an air system for an internal combustion engine in a motor vehicle is provided, having the following steps:

acquiring and temporarily storing sensor values at a predefined sampling interval during a segment duration of the state variable, the segment duration corresponding to one or more periods of a pulsation of the state variable;

determining an average of the sensor values acquired within the segment duration; and correcting the average of the sensor values that has been determined, using a correction variable that depends on the time difference between the segment duration and a multiple of the sampling interval.

State variables of an air system of an internal combustion engine which relate, for example, to a pressure or a mass flow of a gas stream, in particular of an air stream, are usually suitably computationally filtered in the engine control unit of the internal combustion engine, in particular by being averaged. The averaging occurs over one segment duration or several segment durations. "Segment duration" refers to the time duration that corresponds to one oscillation period of the pulsations (pulsation period) of the gas in the air system of the internal combustion engine. The engine control unit receives the sensor values of the relevant sensor for the state variable at regular query times corresponding to the sampling intervals, and averages them over the one or more segment durations.

Because the engine speed represents a continuous variable, the segment durations can also vary continuously. Because the state variable is sampled at specified points in time, a discrepancy can occur between the segment duration and the evaluation period, which corresponds to the time duration during which the sensor values of the sensor for the state variable are taken into consideration within the segment duration. This discrepancy causes a so-called "residual area error" in the calculation of the average, since the discrete sensor values at the beginning and end of the sampling period are not weighted appropriately. A jitter thus occurs because of the discrepancy between the evaluation period and the segment duration, so that the transfer function of the averaging filter is also affected by a jitter. The damping of the pulsation frequency by the averaging function thus ends up being less than would be desirable.

The resulting residual area error depends on the pulsation amplitude of the pulsation frequency and on the deviation in time between the beginning and end of the segment duration, and on the points in time of the first and last sensor value to be considered in the segment duration. Because of the time correlation, the error cannot be corrected by a pulsation correction; it therefore leads to additional signal tolerances and degrades the signal to noise ratio of the processed sensor signal.

One idea of the above method is to correct, by way of the differences that occur between the one or more segment durations and the evaluation period, the error in the averaging of a sensor variable that pulses because of the cyclical operation of the internal combustion engine. For this, in the averaging operation a residual time, constituting a difference between the segment duration and the evaluation period, is correspondingly taken into consideration upon averaging. As a result, the additional signal tolerance due to the difference between the average over the evaluation period and the (as a rule, longer) segment duration can be reduced, and the signal to noise ratio can be improved.

In addition, the segment duration of the current segment can be identified as a function of a current rotation speed of the internal combustion engine.

According to an embodiment, the correction value can be identified as a function of that measured value which is found immediately before a starting point in time that is obtained from an ending point in time, at which, after an end of the segment duration, a sensor value is to be acquired, minus the segment duration.

Provision can be made that the correction value is identified as a function of a correction time duration that is obtained from the time difference between the segment time duration and a time duration that is determined by the product of the sampling interval and the number of sensor values acquired between the starting point in time and the ending point in time.

In particular, the state variable can correspond to a gas mass flow or a pressure in the air system of the internal combustion engine.

Provision can be made that the determination of the average, and the correction of the average that has been determined, are carried out when an end of the segment duration is reached, that duration being predefined by a predetermined crankshaft angle of a crankshaft of the internal combustion engine.

According to a further aspect an apparatus, in particular an engine control unit, is provided for identifying an averaged sensor value of a state variable of an air system for an internal combustion engine in a motor vehicle, the apparatus being embodied:
- to acquire and temporarily store sensor values at a predefined sampling interval during one or more segment durations of the state variable, the segment duration corresponding to one period of a pulsation of the state variable;
- to determine an average of the sensor values acquired within the one or more segment durations;
- to correct the average of the sensor values that has been determined, using a correction variable that depends on the time difference between the one or more segment durations and a multiple of the sampling interval.

DETAILED DESCRIPTION

Figure 1:
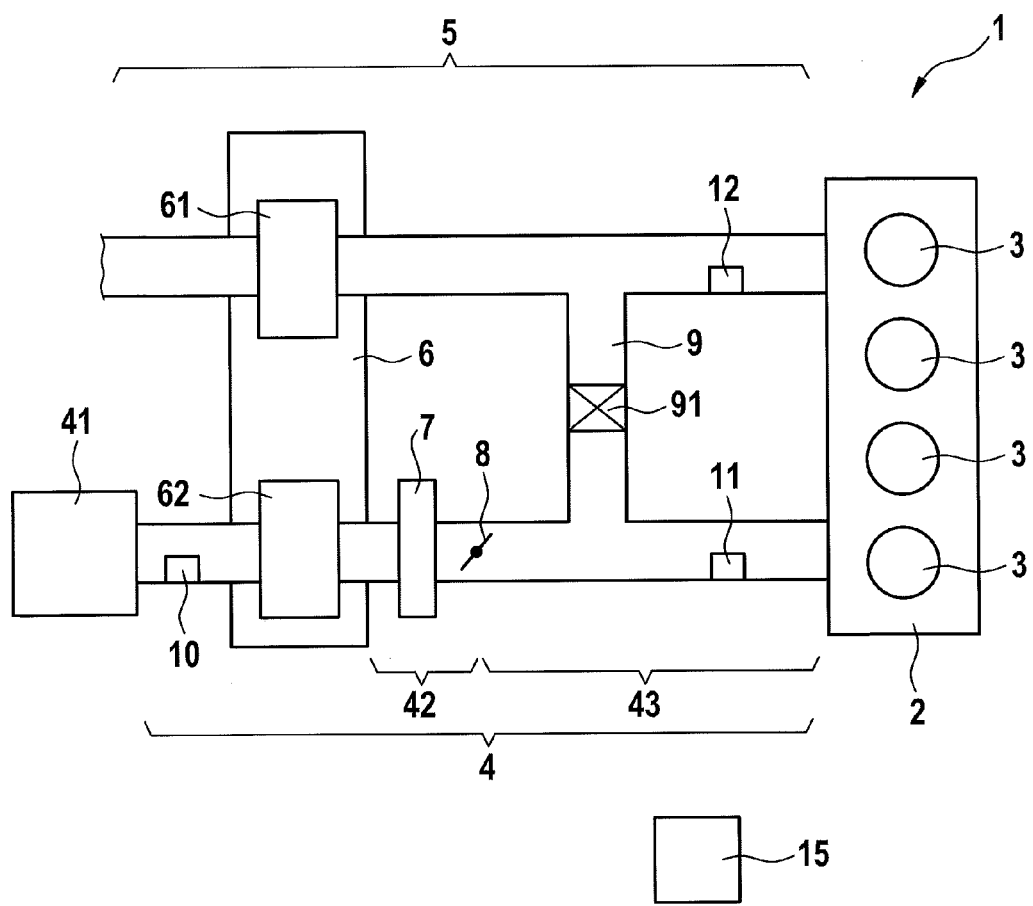
FIG. 1 schematically depicts an engine system having flow sensors and pressure sensors whose sensor values pulsate because of the four-cycle operation of the internal combustion engine.

FIG. 1 schematically shows an engine system 1 having an internal combustion engine 2. Internal combustion engine 2 has cylinders 3 to which air is delivered via an air system 4 and from which combustion exhaust gas is discharged via an exhaust gas discharge section 5.

A boost device 6, which has a turbine 61 in exhaust gas discharge section 5 in order to convert exhaust gas enthalpy into mechanical energy and use that to drive a compressor 62, can be provided. Compressor 62 is disposed in air system 4 and serves to draw in fresh air from the environment via an air filter 41 and make it available via a boost air cooler 7 in a boost pressure portion 42 of air delivery system 4. Boost pressure portion 42 is delimited downstream by a throttle valve 8. An intake manifold portion 43 is provided between throttle valve 8 and the intake valves of cylinders 3 of internal combustion engine 2.

An exhaust gas recirculation conduit 9, which connects exhaust gas discharge section 5 to intake manifold portion 43 of air delivery system 4 in a region between the exhaust valves of internal combustion engine 2 and turbine 61 of the exhaust-gas-driven boost device 6, can furthermore be alternatively or additionally provided. An exhaust gas recirculation valve 91, which is variably controllable in order to adjust an exhaust gas mass flow into intake manifold portion 43, is provided in exhaust gas recirculation conduit 9.

The above engine system 1 furthermore encompasses an engine control unit 15 that, as a function of state variables acquired via sensors and in accordance with a specified target torque, performs an application of control to internal combustion engine 2, in particular by specifying control variables to actuators, for example to throttle valve 8 and to exhaust gas recirculation valve 91, by specifying opening and closing times of the intake and exhaust valves on cylinders 3, and the like.

The above-described configuration of an engine system 1 having an internal combustion engine is merely exemplifying, and what is described below can also be used in engine systems having internal combustion engines with no boost device and/or with no exhaust gas recirculation.

In order to operate internal combustion engine 2, engine control unit 15 receives sensor variables from sensors disposed in engine system 1, for example a mass flow sensor 10, an intake manifold pressure sensor 11, an exhaust gas pressure sensor 12, and the like. Based on the sensor values and on state variables modeled therefrom, engine control unit 15 applies control in known fashion to internal combustion engine 2 in order to furnish a desired torque.

Because of the four-stroke operation of internal combustion engine 2, all sensor values of sensor variables which relate to gas mass flows or gas pressures are impinged upon by pulsations that result from the valve interactions of intake and exhaust gas valves of cylinders 3 of internal combustion engine 2.

Figure 2:
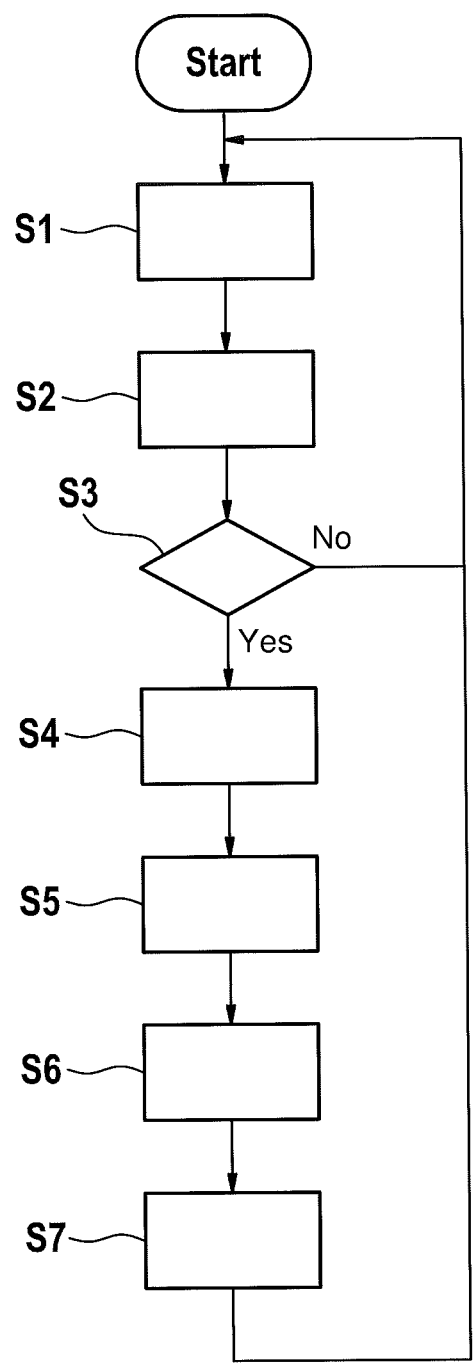
FIG. 2 is a flow chart to illustrate a method for determining a filtered sensor signal.

A method for furnishing a filtered sensor variable will be described below in the flow chart of FIG. 2. For this, the sensor variable is to be filtered in such a way that the periodic fluctuations of the sensor values, produced by the pulsations of the measured state variable, are eliminated.

Figure 3:
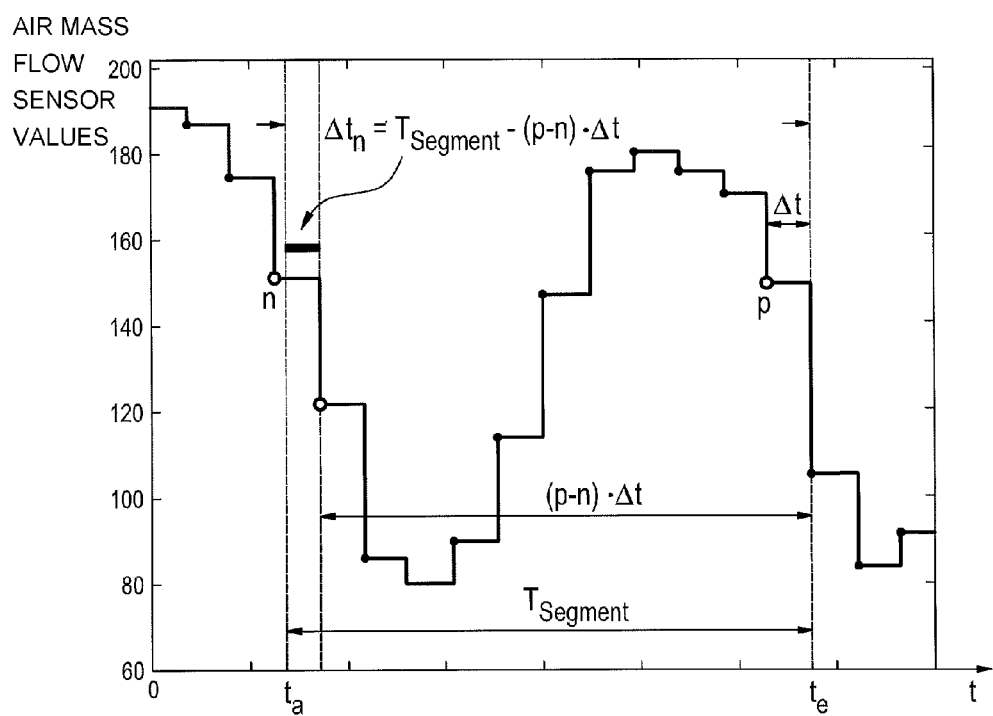
FIG. 3 is a diagram of sensor signal over time, indicating the evaluation period and the segment duration.

In step S1, a sensor value of the sensor variable to be evaluated is acquired and is stored in engine control unit 15. A representation of a profile of the air mass flow is depicted in FIG. 3 on the basis of successively acquired sensor values m. In conjunction with step S3 (explained below), the sensor values are cyclically sampled, acquired, and stored at predefined points in time, i.e. at regular sampling intervals $\Delta t$, for example every millisecond. Because no further information about the sensor variable is available until a respective next sensor value is acquired, there is assumed to be a constant progression until acquisition of the next sensor value. This produces the step-shaped sensor variable profile that is depicted.

In addition, in step S2 a current segment duration $T_{segment}$ is furnished, obtained as follows from the engine speed D as a result of the four-stroke operation of internal combustion engine 2:

$$T_{segment} = (60 \cdot 2)/(D \cdot \text{cyl})$$

where cyl corresponds to the number of cylinders of internal combustion engine 2.

Step S3 checks whether an ending point in time of the current segment has been reached. This can be done by way of a query of the crankshaft angle, usually furnished accurately in the engine control unit. The segment duration is obtained in particular from the number of combustion cycles in cylinders 3 during two rotations of the crankshaft. A specific ending point in time of the segment can thus be associated with specific crankshaft angles. The ending points in time correspond to the points in time at which the crankshaft angles reach one of the angles 720°/k, where k=1 ... cyl.

If it is found in step S3 that a specific crankshaft angle has been reached or exceeded ("Yes" alternative), the method continues with step S4; if not ("No" alternative), execution branches back to step S1.

An average is then identified from the sensor values acquired during the previous segment, in order to furnish a filtered sensor variable. The sensor values acquired at this point in time correspond to $m(t_n)$, $m(t_{n+1})$, $m(t_p)$, where n, n+1, . . . , p corresponds to a counter of the sensor values acquired successively at each sampling point in time within the segment.

If the end of the segment duration does not coincide with a stipulated sampling point in time for the sensor variable, then in step S4 the segment change is shifted virtually to the point in time $t_{p+1}$ of the next sensor value to be acquired, so that the validity of the discrete sensor value $m(t_p)$ most recently acquired belongs entirely to the new virtual segment. In principle, the end of the segment in which an average of the acquired sensor values is to be identified is shifted to an ending point in time $t_e$ of a virtual segment, which is obtained as a point in time $t_p+\Delta t$, where the point in time $t_p$ corresponds to the point in time of the sensor value $m(t_p)$ most recently acquired within the segment, and $\Delta t$ corresponds to the sampling interval of the sensor, or ($1/\Delta t$) of the sampling frequency.

In a further step S5, firstly the starting point in time $t_a$ of the virtual segment is identified from the ending point in time $t_e$ of the virtual (i.e. shifted) segment, with the aid of the segment duration $T_{segment}$. The sensor value that was acquired immediately before the virtual starting point in time $t_a$ of the segment is then identified. This can be the sensor value $m(t_{n-1})$ or $m(t_n)$, depending on the current segment duration $T_{segment}$ and sampling interval $\Delta t$.

In step S6 a correction time duration $\Delta t_n$, $\Delta t_{n-}$ between the virtual starting point in time $t_a=t_e-T_{segment}$ of the shifted virtual segment and the measurement point in time of a measurement point in time next following it, at which a sensor value was acquired, is then determined, as follows:

Case 1:

$\Delta t_n = T_{segment} - (p-n)\Delta t$, if the first measured value $m(t_n)$ acquired in the segment after the shifting of the segment is located outside the virtual segment; and Case 2:

$\Delta t_{n-1} = T_{segment} - (p+1-n)\Delta t$, if the first measured value $m(t_n)$ acquired in the segment after the shifting of the segment is located inside the virtual segment.

In the above equations, p corresponds to a counter of the first sensor value $m(t_p)$ acquired inside the segment, and n corresponds to a counter of the sensor value $m(t_n)$ most recently acquired within the segment.

In step S7, the average of the sensor variables over all relevant sensor values is determined as follows:

for case 1:

$$\overline{m} = \frac{\Delta t_n \cdot m(t_n) + \Delta t \sum_{i=n+1}^{p} m_i}{T_{segment}};$$

for case 2:

$$\overline{m} = \frac{\Delta t_{n-1} \cdot m(t_{n-1}) + \Delta t \sum_{i=n}^{p} m_i}{T_{segment}}.$$

Thanks to the above formulas, all sensor values that are located entirely inside the virtual segment are weighted with the sampling interval $\Delta t$, while the sensor value that was acquired before the virtual starting point in time $t_a$ of the segment is weighted with the time difference previously calculated in step S6. The sum is correspondingly divided by the segment duration $T_{segment}$, yielding an average value of the sensor values which contains an additive correction variable $$\frac{\Delta t_n \cdot m(t_n)}{T_{segment}}$$

or $$\frac{\Delta t_{n-1} \cdot m(t_{n-1})}{T_{segment}}.$$

Further calculations can then be performed in the engine control unit using the sensor variable $\overline{m}$ averaged in this fashion.

Determination of the correction variable by virtual shifting of the segment enables simplified calculation, since otherwise the time-related discretization errors both at the starting point in time of the segment and at the ending point in time of the segment must be taken into consideration. With the method described above it is not necessary to obtain the exact starting and ending points in time of the segment, and it is sufficient merely to identify the segment duration $T_{segment}$ by way of the engine speed n.

What is claimed is:

1. A method for identifying an averaged sensor value of a state variable of an air system for an internal combustion engine in a motor vehicle, the method comprising:
   acquiring and temporarily storing, via a processor, sensor values at a predefined sampling interval during at least one segment duration of the state variable, the segment duration corresponding to one period of a pulsation of the state variable;
   determining, via the processor, an average of the sensor values acquired within the at least one segment duration;
   correcting, via the processor, the average of the sensor values that has been determined, using a correction variable that depends on a time difference between the at least one segment duration and a multiple of the sampling interval, so as to provide filtered sensor values; and
   providing the filtered sensor values to an engine control unit to control the engine so as to provide a desired torque;
   wherein the state variable corresponds to one of a gas mass flow and a pressure in the air system of the internal combustion engine.

2. The method as recited in claim 1, further comprising: identifying the segment duration of a current segment as a function of a current rotation speed of the internal combustion engine.

3. The method as recited in claim 1, further comprising: identifying a correction value as a function of a measured value which is found immediately before a starting point in time that is obtained from an ending point in time, at which, after an end of the segment duration, a sensor value is to be acquired, minus the segment duration.

4. The method as recited in claim 3, wherein the correction value is identified as a function of a correction time duration that is obtained from a time difference between the segment duration and a time duration that is determined by a product of the sampling interval and a number of sensor values acquired between the starting point in time and the ending point in time.

5. The method as recited in claim 1, wherein the determining and the correcting are carried out when an end of the segment duration is reached, the segment duration being predefined by a predetermined crankshaft angle of a crankshaft of the internal combustion engine.

6. An apparatus for identifying an averaged sensor value of a state variable of an air system for an internal combustion engine in a motor vehicle, comprising:
- an acquiring device to acquire and temporarily store sensor values at a predefined sampling interval during at least one segment duration of the state variable, the segment duration corresponding to one period of a pulsation of the state variable;
- a determining device to determine an average of the sensor values acquired within the at least one segment duration; and
- a correcting device to correct the average of the sensor values that has been determined, using a correction variable that depends on a time difference between the at least one segment duration and a multiple of the sampling interval, so as to provide filtered sensor values;
- wherein the filtered sensor values are provided to an engine control unit to control the engine so as to provide a desired torque, and
- wherein the state variable corresponds to one of a gas mass flow and a pressure in the air system of the internal combustion engine.

7. The apparatus as recited in claim 6, wherein the apparatus includes an engine control unit.

8. A non-transitory computer readable medium having a computer program, which is executable by a processor, comprising:
- a program code arrangement having program code for identifying an averaged sensor value of a state variable of an air system for an internal combustion engine in a motor vehicle, by performing the following:
  - acquiring and temporarily storing, via the processor, sensor values at a predefined sampling interval during at least one segment duration of the state variable, the segment duration corresponding to one period of a pulsation of the state variable;
  - determining, via the processor, an average of the sensor values acquired within the at least one segment duration; and
  - correcting, via the processor, the average of the sensor values that has been determined, using a correction variable that depends on a time difference between the at least one segment duration and a multiple of the sampling interval, so as to provide filtered sensor values; and
  - providing the filtered sensor values to an engine control unit to control the engine so as to provide a desired torque;
  - wherein the state variable corresponds to one of a gas mass flow and a pressure in the air system of the internal combustion engine.

9. The computer readable medium of claim 8, further comprising:
- identifying the segment duration of a current segment as a function of a current rotation speed of the internal combustion engine.

* * * * *